United States Patent
Piehler et al.

(10) Patent No.: US 10,338,396 B2
(45) Date of Patent: Jul. 2, 2019

(54) OPTICAL SYSTEM AND A METHOD FOR OPERATING AN HUD

(71) Applicant: Jabil Optics Germany GmbH, Jena (DE)

(72) Inventors: Eberhard Piehler, Jena (DE); Oliver Zeh, Jena (DE); Thomas Beyer, Jena (DE)

(73) Assignee: Jabil Optics Germany GmbH, Jena (DE)

( * ) Notice: Subject to any disclaimer, the term of this patent is extended or adjusted under 35 U.S.C. 154(b) by 15 days.

(21) Appl. No.: 15/499,051

(22) Filed: Apr. 27, 2017

(65) Prior Publication Data

US 2017/0315366 A1      Nov. 2, 2017

(30) Foreign Application Priority Data

Apr. 27, 2016   (DE) .................... 10 2016 107 803

(51) Int. Cl.
  *G03C 5/00*   (2006.01)
  *G02B 27/01*   (2006.01)
  (Continued)

(52) U.S. Cl.
  CPC .......... *G02B 27/0179* (2013.01); *B60K 35/00* (2013.01); *G02B 26/0875* (2013.01); *G02B 27/0101* (2013.01); *B60K 2350/106* (2013.01); *B60K 2350/1072* (2013.01); *B60K 2350/1084* (2013.01); *B60K 2350/2052* (2013.01); *B60K 2350/2095* (2013.01); *B60K 2350/352* (2013.01); *B60K 2350/921* (2013.01);
  (Continued)

(58) Field of Classification Search
  CPC ................................................. G02B 27/0101
  See application file for complete search history.

(56) References Cited

U.S. PATENT DOCUMENTS

| | | |
|---|---|---|
| 4,919,517 A | 4/1990 | Jost et al. |
| 6,750,832 B1 * | 6/2004 | Kleinschmidt ........ B60K 35/00 345/7 |

(Continued)

*Primary Examiner* — Nan-Ying Yang
(74) *Attorney, Agent, or Firm* — Young Basile Hanlon & MacFarlane, P.C.

(57) ABSTRACT

Described is an optical system and method for operating an HUD. The optical system includes an imaging system that generates optical radiation based on image information, a display system that projects the optical radiation, a deflection device that deflects the projected optical radiation, and at least one optically transparent pane-shaped element that at least partially reflects the deflected optical radiation. The deflection device guides the projected optical radiation onto the pane-shaped element, the optical radiation hitting the pane-shaped element at an angle. The imaging system, the display system, the deflection device and the pane-shaped element are arranged to generate a virtual image of optical radiation containing the image information. The optical system includes first and second edge points of the pane-shaped element. The first edge point has a minimal distance ($d_{min}^{(1)}$) to the deflection device and the second edge point has a minimal distance ($d_{min}^{(2)}$) to the imaging system.

12 Claims, 5 Drawing Sheets

(51) Int. Cl.
    *B60K 35/00*   (2006.01)
    *G02B 26/08*   (2006.01)
(52) U.S. Cl.
    CPC .. *G02B 2027/012* (2013.01); *G02B 2027/013* (2013.01); *G02B 2027/0118* (2013.01); *G02B 2027/0159* (2013.01); *G02B 2027/0187* (2013.01)

(56) References Cited

U.S. PATENT DOCUMENTS

| | | | |
|---|---|---|---|
| 2002/0140215 A1* | 10/2002 | Breed | B60N 2/853 280/735 |
| 2003/0142041 A1 | 7/2003 | Barlow et al. | |
| 2007/0184368 A1* | 8/2007 | Nishikawa | G02B 17/08 430/30 |
| 2010/0053100 A1* | 3/2010 | Lin | B60K 35/00 345/173 |
| 2010/0053758 A1* | 3/2010 | Nestorovic | G02B 27/0101 359/601 |
| 2010/0164702 A1* | 7/2010 | Sasaki | G01B 21/22 340/438 |
| 2010/0195184 A1* | 8/2010 | Laino | G02B 27/1026 359/245 |

\* cited by examiner

OPTICAL SYSTEM AND A METHOD FOR OPERATING AN HUD

FIELD OF INVENTION

The invention relates to an optical system and a method for operating a head-up display (HUD). In particular, the present invention relates to an optical system for displaying image information in the visual field of an observer. Further, the invention relates to a method for operating such an HUD, in which, the location-precision display of image information in the visual field of an observer is enabled in particular. This can be used, for example, for HUDs in vehicles on land, on water and in the air, and for general display applications, e.g. for advertising purposes behind display windows.

BACKGROUND

HUDs in vehicles usually consist of an imaging system and a mirror system with 2 or more mirrors, which are all located in the dashboard of the vehicle. With an HUD, the image information emitted by an imaging system is made accessible to an observer, e.g. the driver of a motor vehicle or the pilot of an aeroplane, as a virtual image in their visual field. The size of the image generated by the HUD within the visual field of the observer is usually known as the field of view (FOV). The area on the image side at the observer which is at maximum illuminated by the imaging system is known as the eyebox. The desired size of the eyebox and the FOV define the necessary étendue which must be provided by the imaging system.

In most cases, the visibility of the image information shown is limited to a certain spatial area within the vehicle, so that the observer should be located at least with one eye within the head motion box (HMB) defined by display system used. The HMB has usually a rectangular base area with a size of approx. 220×80 mm$^2$. The HMB is thus related to the observer and indicates the permissible spatial range within which the observer can at least detect a part of the image information presented by the HUD with one eye. On the other hand, the eyebox is more related to the imaging system and is based on the maximum aperture angle of the image in a direction towards the observer. For current HUDs, the HMB and the eyebox do not or not significantly differ from each other in general.

The image sensor serves to display and irradiate image information. A corresponding individual component is described as an imaging system. This can for example be a TFT/LCD display or a Pico projector. The imaging system usually comprises a so-called "imager" (image generator) for displaying the image information. Possible imagers usually take the form of TFT/LCD panels, DMD, LCoS, MEMS or similar. Preferably, the imaging system can be a Pico projector with DMD/LCoS as an imager or also a simple TFT panel. If a TFT panel is used, the image information irradiated by the TFT panel is made accessible to the observer directly as a virtual image in the visual field. If a Pico projector is used, this first generates an interim image on an additional interim screen, wherein this interim image essentially takes on the function of a TFT. The interim image is then usually displayed by a mirror system in the eyebox of the observer.

From a given étendue request (based on a desired size of the eyebox and the FOV) and the precise irradiation properties of a known imaging system, the required size of the imaging system and the irradiation angle to be used can be determined. From this, the minimum size of a TFT panel to be used or of the interim screen when a Pico projector is used is determined.

If a TFT panel is used, image information that is irradiated as a real image of the TFT panel is propagated with the aid of mirrors to a virtual image in front of an observer, with motor vehicles in front of the windscreen, for example. Here, reference can in general be made to a single-step display (imaging system→virtual image).

If a Pico projector is used as an imaging system, the étendue already supplied by the imager, such as a DMD or LCoS, for example, is usually not sufficient. For this reason, it must be enlarged accordingly. Typically, this occurs with the aid of a diffusing panel which is positioned on the plane of the interim image. By enlarging the angle, the diffusing panel also enlarges the étendue of the real interim image on the interim image plane. This interim image with enlarged étendue can now also be propagated to a virtual image within the visual field of an observer with the aid of mirrors. Here, reference can be made to a dual-step display (imaging system→real interim image→virtual image).

In motor vehicles, the HUD has to date been located solely in the dashboard. Here, construction space of approx. 5 l is required for an FOV of 6°×2°. However, in most cases, the available construction space can only be influenced to a limited degree. The size of the first mirror (from the perspective of the virtual image) is essentially determined by the FOV, the angle of the windscreen, and the size of the eyebox. The curve of the windscreen, the optical path from the eye of the observer across the windscreen to the first mirror, and the position of the imaging system within the dashboard are also influential. With the exception of the position of the imaging system, these values are essentially prespecified. However, different positions of the imaging system also require slightly different tilting angles of the mirror to the main beam. As a result, the mirror size is also marginally influenced. The first optical component that can be influenced from the perspective of the driver is thus the first mirror mentioned above.

Future HUDs should support Augmented Reality and thus extend reality by showing additional information or displays. In particular, here, it should be possible to project location-accurate images to the observer, which interact directly and immediately with the visible environment of the observer. Thus, reality can be virtually extended as required, depending on the demands of the current vehicle situation.

In order to realise an Augmented Reality HUD (AR-HUD) in vehicles, a particularly large FOV is required (FOV 10°×6° or larger). Due to the large FOV, significantly larger mirrors for deflecting the beam are also required. These must also be housed in the dashboard and, as a result, require additional construction space (currently more than 15 liters). In the case of an enlargement of the FOV, however, it must be noted that for a fixed imaging system, the brightness of the displayed image is in general reduced. Thus, in order to maintain the brightness of the image and to increase the size of the FOV, in the case of a HUD with an unchanged size of the eyebox, a corresponding enlargement of the imaging system and of the associated display system must also be planned in addition to an enlargement of the deflection device.

Particularly in the dashboard of a motor vehicle, however, there is an increasing lack of space, since the steering column, air conditioning unit, control panel cross-member, windscreen wiper mechanics, windscreen ventilation, a large portion of the vehicle electronics and much more also need to be housed here. The lack of space in the dashboard thus limits the maximum possible size of the FOVs. The car industry, as well as other vehicle manufacturers, is therefore interested in particularly space-saving solutions. For this reason, larger FOVs can only be realised, and the Augmented Reality experience significantly improved, through the corresponding savings in the construction space required.

Vehicle manufacturers are also increasingly in favour of saving electrical energy. With motor vehicles, this is clearly reflected in particular by the increasing use of electricity-saving LEDs for external lighting. If a vehicle uses less energy, the light machine is less of a burden on the engine, which in turn helps to save fuel. Energy savings are also gaining in importance with regard to the achievement of international climate goals. The use of HUDs in vehicles adds a further electric consumer which consumes not inconsiderable levels of power. With current HUDs, however, a large portion of the energy required to generate images is lost unused. On the one hand, with a large eyebox (220×80 mm$^2$), it is often the case that only a very low portion of the energy irradiated from the imaging system contributes to the image information perceived by the observer (up to 0.3%). On the other, with TFT panels or LCoS, often considerable polarisation losses occur, since unpolarised light sources, such as LEDs, are usually used. Additionally, with the dual step display, a great deal of light is lost on the diffusing panel, since the angle spectrum generated is far greater than the area which can be used to display the virtual image.

It is therefore the object of the present invention to provide a system and a method for operating an HUD which overcome the described disadvantages of the prior art, and which make it possible to enable corresponding display applications, even with limited construction space with the largest possible FOV with high energy efficiency. In particular, the increased use of Augmented Reality in vehicles should be enabled as a result.

SUMMARY

These objects are attained according to the invention by the independent patent claims. Preferred embodiments of the invention are contained in the dependent claims.

The optical system according to the invention comprises an imaging system designed to generate optical radiation based on image information; a display system designed to project the generated optical radiation; a deflection device designed to deflect the projected optical radiation; at least one optically transparent pane-shaped element, designed to at least partially reflect the deflected optical radiation, wherein the deflection device guides the projected optical radiation onto the pane-shaped element in such a manner that the optical radiation hits the pane-shaped element at an angle; wherein the imaging system, the display system, the deflection device and the pane-shaped element are arranged in relation to each other such that they generate a virtual image of the optical radiation that contains the image information. Preferably, the deflection device allows an active control of the deflection direction in at least two degrees of freedom. Preferably, in an optical system according to the invention a first edge point of the pane-shaped element differs from a second edge point of the pane-shaped element, wherein the first edge point is at a minimum distance from the deflection device, and the second edge point is at a minimum distance from the imaging system. Further, the optical system may comprise a means for eye position detection adapted to detect the line of sight (LoS) of an observer to the pane-shaped element; and a means for evaluation and control, adapted to vary the position of the virtual image in the region of the pane-shaped element by means of the deflection device such that the virtual image is tracked to the LoS of the observer. In particular, an active control of the deflection direction can be effected by the means for evaluation and control.

Preferably, by tracking the position of the virtual image in the region of the pane-shaped element to a changed LoS of the observer (for example in the case of a head or eye movement), a corresponding tracking of the eyebox of the optical system can also take place so that at least one eye of the observer is still within the eyebox of the optical system even after the change of the LoS.

Here, all information in image form can be understood as being image information. For vehicles, this can be the current speed of the vehicle or information for extending the reality in the visual field of the vehicle driver, or the other passengers, for example. The imaging system in this case has the task of generating a corresponding optical radiation from image information transmitted to it. Here, it is of no importance whether the imaging system generates the optical radiation primarily with the image information (e.g. OLED) or whether the imaging system merely impresses the image information of the optical radiation already generated by other means, for example via a DMD (micro-mirror gel actuator or Digital Micromirror Device), onto which light is beamed on without image information.

The optical radiation generated is guided along an optical beam path to the pane-shaped element. The beam path is here preferably directed from the image sensor via the display system via the deflection device onto the pane-shaped element. Here, the final optical component which is arranged in the beam path before the pane-shaped element and which is designed to enable a tilting of the beam path along the optical axes of the deflection device is understood as being the deflection device. The deflection device may allow an active control of the deflection direction in at least two degrees of freedom. These degrees of freedom can preferably be two independent angles for a variation of the position of the virtual image in the region of the pane-shaped element in two orthogonal directions on the pane-shaped element. An active control can be, in particular, an electronic or electromechanical position control. Preferably, such a position control is effected by means of electromechanical positioning elements or by means of piezo-actuators.

The display system comprises all optical components between the imaging system and the deflection device. It extends across the entire area between the imaging system and the deflection device. The deflection device and pane-shaped element are not comprised in the display system. With such an embodiment, no further optical components are required in the beam path. An arrangement of additional optical components between the deflection device and pane-shaped element remains optional. These can, for example, be filter elements or additional lenses or lens systems, or mirrors or mirror systems.

Preferably, a first edge point of the pane-shaped element differs from a second edge point of the pane-shaped element, wherein the first edge point comprises a minimal distance to the deflection device and the second edge point comprises a minimal distance to the imaging system.

Preferably, a planar window pane, a display area or the curved front windscreen of a vehicle can be used as a pane-shaped element. These are essentially two-dimensional extended surface elements with two surfaces opposite each other. Along the respective outer edges of these surfaces, the edge of the pane-shaped element is located in a circumferential ring shape. The two surfaces of the pane-shaped element can be arranged planar and parallel to each other. Preferably, the pane-shaped element comprises a certain spatial curve of the surfaces, however, such as with the front windscreen of a vehicle. In the minimum outer dimension, i.e. the geometric measurement of a smallest possible repackaging, such a pane-shaped element can be assigned a height and a breadth. The depth of the pane-shaped element which further results essentially reflects the curve of the surfaces and is here not of further relevance. The distance of the two surfaces is described as the thickness of the pane-shaped element. In general, the thickness of the pane-shaped element corresponds to the thickness of the edge. In particular, a pane-shaped element is characterised by the fact that the thickness of the element is negligibly small compared to the height and breadth of the pane-shaped element. A position on the edge of the pane-shaped element is described as an edge point. The length of the edge along the pane-shaped element is described as the circumference U.

In a given spatial arrangement of a pane-shaped element, a deflection device and an imaging system, the respective distances between the elements can be determined. Here, the reference point for the imaging system is regarded as being the point of intersection of the sensor plane (the object plane of the imaging system) with the optical axis of the imaging system. This preferably corresponds to the centre of the imaging system on the image plane. The shared point of intersection of the two optical axes of the deflection device are regarded as being the reference point of the deflection device, which are respectively oriented in the direction of the radiation entering the deflection device (from the direction of the imaging system) and the radiation exiting from the deflection device (in the direction of the pane-shaped element). On the basis of these two reference points, a minimum distance to the edge of the pane-shaped element emerges respectively. The respective distance vectors then characterise two edge points, wherein according to the invention, the first edge point of the pane-shaped element differs from the second edge point of the pane-shaped element.

Preferably, the distance between the first edge point and the second edge point along the circumference of the pane-shaped element is at least 10% of the circumference of the pane-shaped element. Further, distances of at least 1%, 2%, 5%, 10%, 15%, 20%, 25%, 30%, 35%, 40%, 45%, 49%, or 49.99% of the circumference of the pane-shaped element are also preferred. Further preferred are distances of at least the circumference of the pane-shaped element. This means that with a circular or elliptical pane-shaped element, for example, the two edge points have a minimum distance which preferably has a value in the range of half the circumference. In contrast to this, in the prior art, the imaging system and deflection device are usually located on a shared axis in relation to the edge of the pane-shaped element. With such an arrangement, corresponding edge points lie without a distance and superimposed on the edge.

Preferably, a pane-shaped element can also be characterised in relation to its environment by four specially marked edge areas. With a curved pane-shaped element, a corresponding assignment within the curved plane can be made. Marked edge areas can for example be an upper and a lower edge and a left-hand and right-hand side edge. In particular the upper and lower edge and the left-hand and right-hand side edge can at least approximately lie opposite each other. The designation of the individual edge areas is freely selectable. Here, a side edge always conjoins with an upper and a lower edge, however. An example of a pane-shaped element with particularly marked edge areas is the edge area of a windscreen of a motor vehicle. When a corresponding pane-shaped element with marked edge areas is present, it is particularly preferred when the first edge point and the second edge point are located on edges opposite each other. In particular, it is preferred when one edge point is located on an upper edge and the other edge point is located on a lower edge. Also preferred are arrangements in which one edge point is located on a side edge and the other edge point is located on an opposite side edge, on an upper edge or on a lower edge.

Preferably, at least a portion of the imaging system unit is arranged outside of an area of the pane-shaped element facing the deflection device. Accordingly, preferably at least one portion of the imaging system unit is arranged in an area of the pane-shaped element facing away from the deflection device. Preferably, at least one portion of the imaging system unit is arranged such that the area of the pane-shaped element facing towards this portion differs from an area of the pane-shaped element facing towards the deflection device. The terms "facing towards" and "facing away from" here relate to the position of the deflection device or imaging system in relation to the spatial alignment of the pane-shaped element. If a normal vector of the surface of the pane-shaped element points in the direction of the deflection device, the deflection device faces towards the pane-shaped element. "Facing away from" thus means "not pointing in this direction". Here, the direction incorporates a corresponding direction bundle with an opening angle of preferably less than 90°, less than 60°, less than 45° or less than 22.5°.

By the generalized term "eye position detection", a determination of both the absolute position of at least one eye of a possible observer in space (preferably within the HMB) and a determination of the "intrinsic" position of this eye, i.e. the viewing direction of a person, is understood. In terms of its exact position and orientation in space (preferably within the HMB), the LoS then results from the determined spatial eye position and the direction of viewing, wherein the LoS should have an intersection with the display area of the pane-shaped element (as the desired position of the actual virtual image or sub-image) for projection. For a case of a detection of both eyes of an observer, a spatial mean value of the individual lines of sight of the eyes can preferably be used as a common viewing line for evaluation. The means for eye position detection may additionally comprise a means for distance determination. In this case, the length of a determined LoS from the eye to the intersection of the LoS with the display area of the pane-shaped element is regarded as the distance. In particular, a computational evaluation of previously ascertained eye position data can take place for this purpose. However, the means for distance determination may also be an additional system which is independent of the means for eye position detection. Preferably, an evaluation is carried out on the basis of an optical camera image from the observer or by using additional sensors.

A first aspect of the idea of the present invention is that in motor vehicles, for example, only a single optical component, the deflection device, preferably comprising a single rotatably supported mirror, needs to be placed in the dashboard. All other optical components needed to display the virtual image (imaging system with display system) can be arranged in another place within a vehicle. Within a motor vehicle, possible positions for placement are e.g. below the roof, within the rear mirror carrier or in one of the vehicle pillars, preferably in one of the two A or B pillars. Further, using additional measures, these components can also be housed in the area of the middle of the car, the tailgate or within the trunk. A mirror inserted in the dashboard in the deflection device can then also be smaller than the largest mirror in the architectures named in the prior art, since an arrangement at a smaller angle to the main beam is possible. In order to achieve the most compact construction possible in this case, according to the invention, a single-step display is preferably used with a Pico projector as an imaging system.

A second aspect of the idea of the present invention is that an enlargement of the effective FOV of a HUD can also be achieved for the case that the optical system illuminates only a very small eyebox when this eyebox can be continuously adapted to the LoS of the observer. Thus, the projected virtual image can follow a head or eye movement of the observer. In particular, the effective FOV can then result from a summation of individual virtual sub-images. Since these sub-images can be relatively small and since only a very small eyebox has to be illuminated by the imaging system, the requirements for the necessary étendue, which must be provided by the imaging system, are also very small. This, in turn, allows the use of extremely small and compact imaging systems. Therefore, an HUD with a maximum FOV and with high energy efficiency is also possible in the case of restricted installation space.

An adaptation of the eyebox is understood to mean both a change in the absolute position of the eyebox in the room (preferably within the HMB) and a change in the size of the eyebox, that is, with respect to the eyebox, the term "adaption" includes the two facts "tracking" and "resizing". In this way, a system according to the invention can be used in particular to design the HMB and the eyebox of an HUD independently of one another. A very small eyebox can fill a much larger HMB (for example, also with the same FOV as with a conventional HUD). Furthermore, the adaptation of the eyebox can also be used to extend the effective FOV of the optical system within the extended HMB in such a way that different image information can also be displayed as virtual partial images (sub-images) depending on the determined eye position.

Although in such a system the eyebox has to be moved in its position and adjusted to the LoS of an observer, the imaging system and the associated display system can still be significantly reduced in their size compared to conventional systems despite an increased FOV. This significantly reduces the space requirements for the overall system. This also allows for greater flexibility in the positioning of the imaging system. In particular, the imaging system can thus be fully unobtrusively integrated in the roof of a vehicle. In addition to a smaller installation space and despite a significantly increased maximum FOV compared to conventional HUD systems, a significant reduction in the energy requirement for the operation of the HUD is made possible even at approximately the same brightness of the displayed image. Thus, in the case of conventional HUDs, the HMB (where the HMB basically corresponds to the eyebox) usually has a rectangular base area with a size of approximately 220×80 mm². The eyebox of an optical system according to the invention can, for example, be much smaller, for example, by an area factor of 220 (especially for a HMB of the same size). The FOV of an optical system according to the invention can, however, be expanded almost arbitrarily as a result of the provided tracking of the eyebox. The HMB of an optical system according to the invention results from the actual visibility of the FOV and is not limited by the size of the eyebox.

The problem of energy efficiency is in particular solved by the fact that the étendue does not have to be enlarged, i.e. only a small eyebox is illuminated that can merely be a single-figure factor larger than the eye's pupil. As a result, an efficiency of 10% to almost 100% (instead of 0.3% with conventional HUDs with a rectangular eyebox) can be achieved in the eyebox. For this purpose, the eyebox should preferably track the movement of the head (eye position) of the driver. Due to the single-step display, no diffusing panel is required that would entail high energy losses. The entire light which leaves the imaging system, for example a Pico projector, is thus propagated into the eyebox. If a DMD is used as an imager in the imaging system, no polarisation losses also occur, as would be the case if a TFT panel or LCoS were to be used, for example.

Due to a spatial separation of the individual components of the optical display system according to the invention, considerably less construction space may be therefore required in the dashboard of a motor vehicle in comparison to conventional systems. Further application options of the invention emerge for corresponding display systems for displaying image information on other vehicles on land, on the water and in the air. Equally, the invention can also be used for general display applications outside of vehicles. Due to the spatial separation of the deflection device and the imaging system, the construction space-saving and energy efficient projection of virtual images onto other pane-shaped elements is in particular enabled. Here, the use of general projection surfaces for display and monitoring applications are feasible. Here, each pane-shaped element, in particular window panes, viewing windows, display windows or similar, can be used to generate a virtual image. This in particular also enables Augmented Reality applications through these pane-shaped elements.

The imaging system is preferably very small and compact, so that it can be positioned in any place within a vehicle. For this reason, preferably the smallest possible imager should be used for the Pico projector. It can be a DMD for example. With such an imager, despite a large FOV high contrasts and brightnesses can also be achieved according to the invention. However, the imager only provides a small étendue but which is completely sufficient in an optical system according to the invention.

Preferably, for each LoS of an observer to the pane-shaped element, the size of the virtual image directly generated by the imaging system is less than 90%, more preferably less than 50%, more preferably less than 25%, more preferably less than 10%, and still more preferably less than 0.1% of the FOV of the optical system. Preferably, in particular for monocular adaption, the size of the eyebox corresponds approximately to the volume of one eye of an observer or, e.g. for binocular adaption, approximately to a minimum volume, in which both eyes of an observer can be included. More preferably, a base surface of the eyebox is only slightly larger than a pupil diameter of the corresponding observer. In the case of monocular adaptation, the virtual image preferably appears directly on the pane-shaped element ("2D" projection), while in the case of a binocular adaptation, a spatial projection is also made possible before and/or behind the pane-shaped element ("3D" projection).

In order to save on construction space, it is advantageous not to enlarge the étendue of the imager through a diffusion panel, but to realise the projection via a single-step display. Preferably, with the optical system according to the invention, a small imager is used in the imaging system and the étendue is not enlarged. Only a small eyebox is illuminated and this tracks the spatial movements of the eye or direction of view of the observer. An FOV larger than 10°×6° is possible. Particularly preferred are FOVs of e.g. 15°×7.5° and larger. The size of the illuminated eyebox is preferably approximately the size of the eye's pupil, i.e. between around 1 mm during the day and 8 mm at night. Further preferred are eyeboxes with diameters of smaller that 100 mm, more preferred smaller than 30 mm, more preferred smaller 20 mm, and even more preferred smaller than 10 mm. In particular preferred, are eyeboxes with diameters of between 1 mm and 50 mm, more preferred between 5 mm and 30 mm, and even more preferred between 10 mm and 30 mm.

In particular when driving vehicles, the spatial position of the eyes of the driver or their direction of view is not fixed on one location or direction. To a far greater extent, these two parameters are subject to constant change. Therefore, it is particularly preferred that the eyebox tracks the movements of the driver. Here, movements of the driver are all movements which make it necessary to adapt the position of the eyebox of the optical display system according to the invention. Alongside general changes in the position of the eyes of the observer through head or body movements of the observer, here in particular, the direction of view of an observer onto the pane-shaped element can also be taken into account. It is therefore particularly preferred that the optical system according to the invention comprises a means for capturing the eye position, which is designed to generate an adjustment of the eyebox to the eye position of the observer. It is also preferred that the optical system according to the invention comprises a means for capturing the direction of view designed to capture the direction of view of an observer onto the pane-shaped element, and to generate an adjustment of the eyebox or the image information shown to the direction of view of the observer onto the pane-shaped element. It is preferred that the means for evaluation and control is furthermore designed to adapt the eyebox and/or the projected image information to the LoS of the observer to the pane-shaped element.

In a particularly preferred manner, the eyebox is adjusted by means of the deflection device, for example through tilting movements of a mirror which it comprises. In order for the image quality to remain constant throughout, however, a corresponding adjustment of the display system should also be made. For this purpose, a lens comprised by the display system can also be tilted and/or at least one air gap in the display system can be adjusted. The tilting point of the lens is here preferably close to the lens in order to keep the movement of the lens as small as possible. Here, every distance between two optical construction elements or components within the display system are designated as the air gap. In particular, for example, this can be a distance within a lens or an air gap of the respective outermost optical construction element of the display system to the imaging system or to the deflection device. Preferably, the means for evaluation and control is also designed to control the optical properties of the display system. In particular, a focal length of an imaging lens of the display system can be varied by the means for evaluation and control, preferably as a function of the length of a LoS of the observer. Preferably, the display system can contain an additional mirror, which in motor vehicles is housed in the roof area, for example. A correction of display errors that occur can then also be achieved via a corresponding tilting of this mirror. Such an embodiment brings advantages in the mechanical implementation of the optical system, since a mirror can be more easily tilted than a lens with illumination. Preferably, both embodiments of one display correction can also be used together. A mirror in the display system can otherwise also be used for an additional folding of the beam path, e.g. for bridging greater distances with a vehicle.

The information regarding the LoS of the observer to the pane-shaped element can by determined through a means eye position detection, e.g. an eye tracking module. Corresponding eye tracking systems for HUD applications are known, for example, from US 2003/0142041 A1 or US 2012/0139817 A1. With the aid of an eye tracking module the absolute position of the eyes of an observer to be evaluated in the room can usually also be determined. For this reason, corresponding eye tracking modules are also suitable as means for eye position detection. An additional evaluation of the direction of view is not required here.

Due to the incorporation of spatial eye position data and/or view direction data, the virtual image can with such an optical system be, for example, held at a fixed position in front of a vehicle (e.g. to display of the current speed above the hood of a motor vehicle) or outside a vehicle (e.g. for optical highlighting traffic signs or to display animals or pedestrians at the roadside). The virtual image can also be tracked to the actual LoS so that, for example, the display of the current speed or the representation of relevant traffic signs always remain visible for all allowable viewing directions and spatial eye positions of the observer. Equally possible is an individual adaptation of the image information shown depending on the direction of view of the observer. For example, the size or the content of information represented as a virtual image can be changed as a function of the LoS of the observer.

An optical system according to the invention and including a tracking of the eyebox can however lead to an enlargement with regard to the deflection device of the mirror area required, and thus to an enlargement of the necessary construction space in the dashboard. However, the optical system according to the invention can also be developed and optimised in order to achieve the most minimal mirror size possible. Then, the main beam of the optical system must be affixed using all, if possible, or a plurality of possible observer positions on the deflection device. Here, the virtual image would move according to the movement of the driver or the change in their direction of view onto the pane-shaped element. The size of a mirror comprised by the deflection device would then be determined in the main by the FOV, and not additionally by the necessary scope of movement of the small eyebox. In order to realise location-accurate representations despite this fact, the image could track the movements of the driver. This would create a displacement of the image content on the imager and thus a reduction in size of the maximum possible FOV. Thus, with this variant, only a portion of the imaging system could be used for displaying the contents. Alternatively, however, the position of the imager in the imaging system or the position of the entire imaging system in relation to the display system can be subsequently regulated by means of actuators.

Preferably, the optical system comprises a means for distance determination to determine the length of a line of sight (LoS) of an observer to the pane-shaped element (e.g. determined by the means for eye position detection). By means of the means for evaluation and control, an adaptation of the size of the eyebox of the optical system to the length of a LoS of an observer to the pane-shaped element (e.g. determined by the means for eye position detection) can then be carried out.

Preferably, only one single mirror is located in the dashboard of a vehicle as a deflection device; all other optical components of the optical system according to the invention are located outside of the dashboard. It is particularly preferred that the deflection device comprises a mirror that is supported in such a manner that it is rotatable and/or that its position can be changed. Equally preferred is the use of an adaptive mirror, which permits a local change to its reflection properties. This can also be a single, interrelated mirror element that can be re-shaped via actuators, or a plurality or an array of free micromirrors, the direction of which can be changed.

The deflection device can also comprise further optical construction elements alongside a mirror, however. Preferred is the combination of a mirror with one or two additional lenses for reducing the mirror size. In particular with motor vehicles, a lens can be installed in the dashboard between the windscreen and the mirror. With the aid of this lens, the size of the mirror and thus the necessary construction space can be reduced. The lens here preferably features a smaller diameter than the mirror with an application without a lens, since it can be positioned in a more favourable angle to the main beam.

The generation of a virtual image is based on the reflection of the optical beam falling onto the pane-shaped element in at least one eye of an observer. For the structure of an HUD, the pane-shaped element is here preferably transparent or at least semi-transparent. In order to create a corresponding reflection of the optical beam entering from the deflection device in the direction of an observer, the pane-shaped element must be at least partially reflective for the optical beam that enters. This can preferably be achieved through a corresponding layering of one or both surfaces of the pane-shaped element. For single-colour HUDs in particular a reflection band limited to a narrow spectral range can be used.

An optical system according to the invention is particularly interesting for novel augmented reality applications since, for example, it is also possible to integrate route data, touristic background information or, in particular, environmental data concerning the traffic safety (e.g. night vision information) directly into the observer's field of view. Besides the use in vehicles, the optical system according to the invention can also be used, for example, for personalized advertising purposes or as a general projection and displaying option, for example, on shop window surfaces or other surfaces acting as a suitable pane-shaped element.

Preferably, the optical system comprises means for suppressing sun reflections. These means can in particular be a glare protection (e.g. in the form of a shade), which prevents or at least reduces the entrance of sunlight into the optical system. Further, this can here preferably be an optical filter element that spectrally filters radiation entering from outside, also in order to prevent or reduce a heating of the optical system via infrared radiation that enters. Further, narrow-strip optical radiation in combination with an optical filter can be used in front of the deflection device. This then blocks almost the entire sunlight. In motor vehicles, these filters can be integrated into the covering which is located in the dashboard. Thus, no new construction element and also no new source or any sun reflection is added. The covering is preferably constructed in such a manner that it cannot dazzle the driver. Also possible are polarisation filters in front of the mirror in order to minimise the intensity of the sunlight. These filters can also be integrated in the covering in the dashboard in motor vehicles. Preferably there is a detection of sunlight entering, e.g. behind the deflection device, in order to guarantee the safety of the eyes of the driver and if necessary also the passengers. Only with unfavourable sunlight entrance does the sunlight need to be blocked, so that it does not fall in the eyebox. In order to reduce the sunlight (e.g. the heating of the lens, the dazzling of the driver, etc.) the pane-shaped element can also be used by impressing corresponding properties onto the material or surfaces. The reduction in sunlight can also be achieved through a combination of the effects of different elements.

The method according to the invention is based on the use of the optical system described above, and uses the advantages arising from this in the display of image information in the field of view of an observer, in particular when used within vehicles.

In particular, the method presented for operating an HUD comprises as method steps the provision of an optical system according to the independent system claim or one of the associated subclaims; and the generation of a virtual optical display of an item of image information displayed by the imaging system in the area of the pane-shaped element. Furthermore, the method according to the invention can comprise as method steps the determination of the line of sight (LoS) of an observer to the pane-shaped element; and the variation of the position of the virtual image in the region of the pane-shaped element, and/or the adaptation of the eye box and/or the projected image information to a LoS of an observer to the pane-shaped element. Also preferably, the method can comprise as method steps the determination of the length of a LoS of an observer; and the adaptation of the size of the eyebox of the optical system to the length of a LoS of the observer. The method according to the invention is suitable for enabling Augmented Reality in vehicles with limited construction space conditions in the visual field of an observer.

BRIEF DESCRIPTION OF THE DRAWINGS

The invention will now be explained below in exemplary embodiments with reference to the associated drawings, in which.

DETAILED DESCRIPTION OF THE PREFERRED EMBODIMENTS

Figure 1:
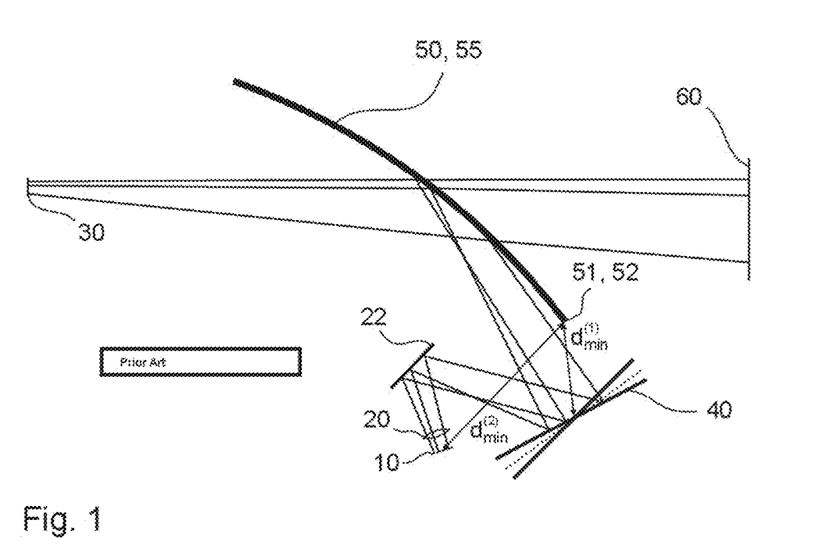
FIG. 1 shows a schematic view of a conventional optical system for operating an HUD in motor vehicles.

FIG. 1 shows a schematic view of a conventional system for operating an HUD in motor vehicles. The creation of a virtual image 60 is here enabled by a reflection of an optical radiation, containing the image information to be displayed, on the windscreen 55 of the motor vehicle as a pane-shaped element 50. The reflection occurs in the direction of an observer 30, e.g. a vehicle driver. Typically, such an optical system comprises at least one imaging system 10, a display system 20 and a deflection device 40. The display system 20 usually comprises a lens system as a lens. Further, a means for beam guidance 22 of the display system 20 can be comprised. Here, this can in particular be a mirror, which guides optical radiation of the deflection device 40 that enters the mirror. The means for beam guidance 22 here serve primarily to create the most compact folding possible of the beam path. The deflection device 40 can also be a mirror. The deflection device 40 has the task of guiding the entering optical radiation to the pane-shaped element 50 in such a manner that the generation of a virtual display for a plurality of observer positions within a certain HMB is enabled. The mirror of the deflection device 40 is also usually aspherical or formed as a free-formed surface and can be changed in its situation or position, so that an adjustment of the image generation to the size or sitting position of an observer 30 is enabled. The latter can then for example select a favourable setting for the position of the virtual image 60 before starting to drive.

In the prior art, imaging system 10, display system 20 and deflection device 40 are usually arranged and housed as a compact unit within the dashboard of the vehicle, preferably in the area of the steering column along a shared main plane (drawing plane). With a distance observation according to the invention between the pane-shaped element 50 and the deflection device 40 or the pane-shaped element 50 and the imaging system 10, the distance vectors which here result from the first minimal distance $d_{min}^{(1)}$ and the second minimal distance $d_{min}^{(2)}$ also lie within this plane and thus feature a shared intersection point with the edge of the pane-shaped element 50. Thus, a first edge point 51 emerges, which coincides with the second edge point 52. Such an optical system therefore requires the corresponding construction space below the windscreen 55.

Figure 2:
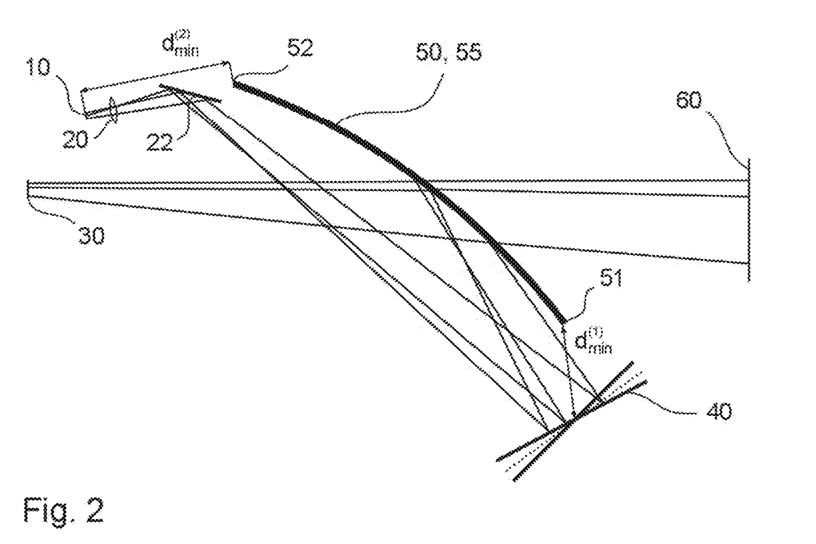
FIG. 2 shows a schematic view of a first embodiment of an optical system according to the invention for operating an HUD in motor vehicles.

FIG. 2 shows a schematic view of a first embodiment of an optical system according to the invention for operating an HUD in motor vehicles. The construction parts shown in FIG. 1 with their reference numerals are found accordingly. Unlike the optical system shown in FIG. 1, however, the situation of the imaging system 10 and the display system 20 differs in relation to the deflection device 40 and to the pane-shaped element 50. The imaging system 10, display system 20 and deflection device 40 are also located in the drawing below a common main plane (drawing plane). Due to the arrangement of the imaging system 10 and the display system 20 in the upper area of the pane-shaped element 50 and of the deflection device 40 on the lower area of the pane-shaped element 50, with a distance observation according to the invention with regard to the pane-shaped element 50, a first minimal distance $d_{min}^{(1)}$ and a second minimal distance $d_{min}^{(2)}$ to the edge of the pane-shaped element 50 result. Thus, a first edge point 51 of the pane-shaped element 50 results, which differs from a second edge point 52 of the pane-shaped element 50, wherein the first edge point 51 features a minimal distance $d_{min}^{(1)}$ to the deflection device 40 and the second edge point 52 features a minimal distance $d_{min}^{(2)}$ to the imaging system 10. As a result, preferably, the position of the imaging system 10 and display facility 20 can be spatially decoupled from the position of the deflection device 40. Accordingly, below the pane-shaped element 50, i.e. in motor vehicles, in the area below the windscreen 55, preferably in the area of the steering column, considerably less construction space is required than would be the case with a conventional optical system. Otherwise, the imaging system 10, the display system 20 and the deflection device 40 feature no shared main plane. All these components can be positioned freely in the space. In particular, beam paths folded three-dimensionally in the space are preferred, for example in order in motor vehicles to enable the optical radiation of an imaging system 10 located on the driver's side B-pillar through the use of a corresponding means for beam guidance 22 for generating a virtual image 60 in a position located centrally on the windscreen 55.

Figure 3:
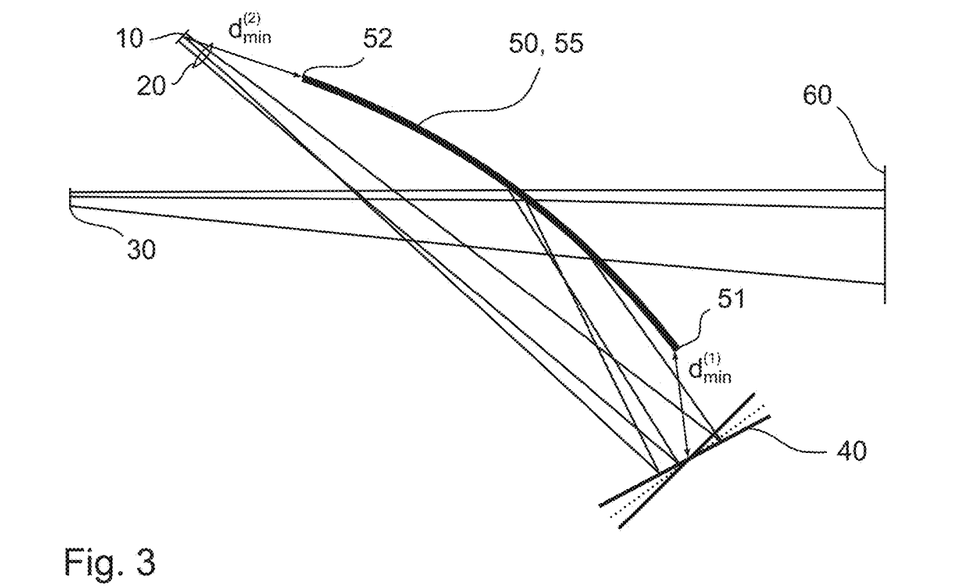
FIG. 3 shows a schematic view of a second embodiment of an optical system according to the invention for operating an HUD in motor vehicles.

FIG. 3 shows a schematic view of a second embodiment of an optical system according to the invention for operating an HUD in motor vehicles. The embodiment shown largely corresponds to the embodiment shown in FIG. 2, and the reference numerals apply accordingly. Unlike in FIG. 2, with this exemplary embodiment, however, the means for beam guidance 22 are lacking in the display system 22. In particular, this exemplary embodiment comprises an embodiment of an optical system according to the invention in which a direct viewing axis between the imaging system 10 and the deflection device 40 exists. An additional means for beam guidance 22 can be omitted as a result. In motor vehicles, for example, the imaging system 10 and the display system 20 can be housed within the rear mirror carrier, so that due to a direct viewing axis to a deflection device 40 located in the dashboard, additional construction space can be saved.

Figure 4:
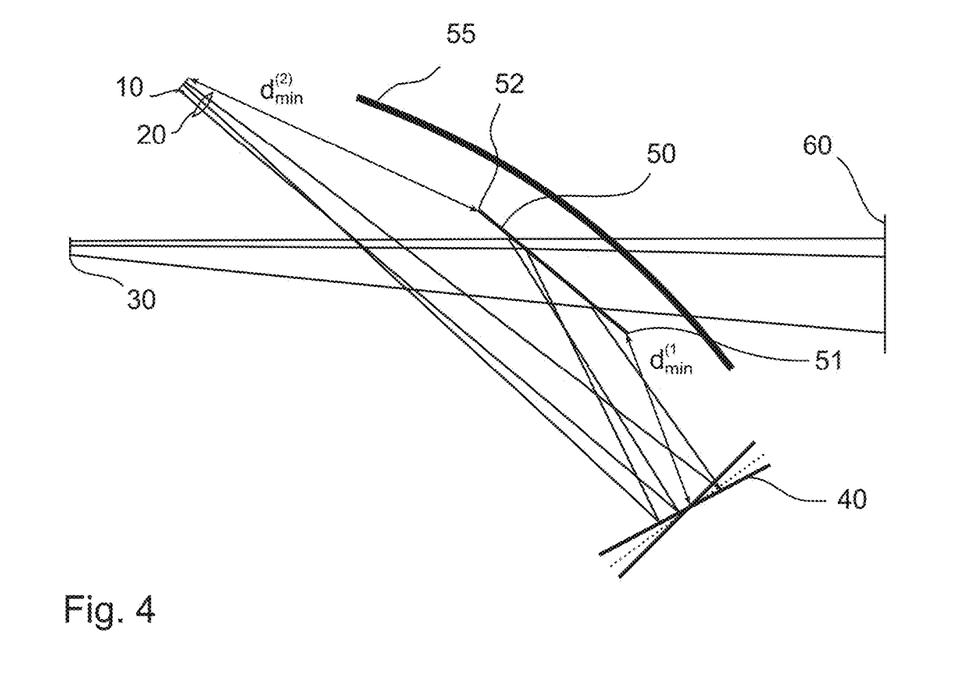
FIG. 4 shows a schematic view of a third embodiment of an optical system according to the invention for operating an HUD in motor vehicles.

FIG. 4 shows a schematic view of a third embodiment of an optical system according to the invention for operating an HUD in motor vehicles. The embodiment shown largely corresponds to the embodiment shown in FIG. 3, and the same reference numerals apply. With this embodiment, however, the virtual image 60 is not generated by a reflection of the radiation entering on a windscreen 55. To a far greater extent, an additional pane-shaped element 50 is located in front of the windscreen 55, which reflects the radiation entering from the direction of the deflection device 40 in the direction of an observer 30. The pane-shaped element 50 can here consist of a reflection pane made of acrylic glass, for example, or another transparent plastic.

Figure 5:
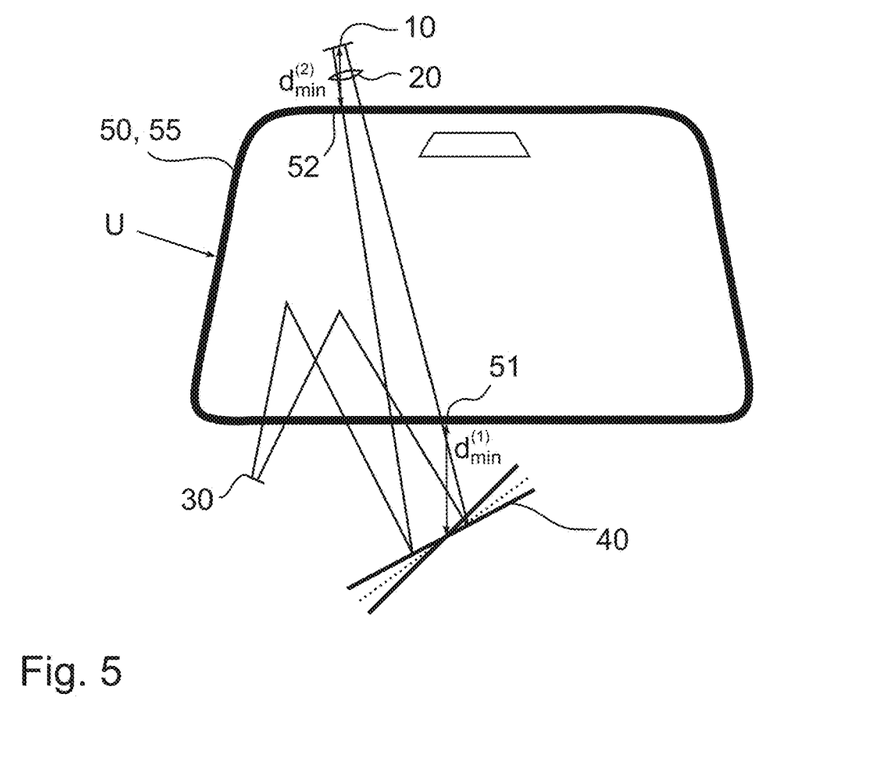
FIG. 5 shows a schematic view of a top view of an embodiment of an optical system according to the invention for operating an HUD in motor vehicles.

FIG. 5 shows a schematic view of the top view of an embodiment of an optical system according to the invention for operating an HUD in motor vehicles. The view shown largely corresponds to the embodiment shown in FIG. 3, with a windscreen 55 as a pane-shaped element 50, the same reference numerals apply. The view shows a preferred beam guidance of the optical system according to the invention in motor vehicles. The imaging system 10 and the display system 20 are arranged in the lower area of the windscreen 55. The deflection device 40 is arranged in the lower area of the windscreen 55. Here, the first minimal distance $d_{min}^{(1)}$ between the pane-shaped element 50 and the deflection device 40 marks a first edge point 51 and the second minimal distance $d_{min}^{(2)}$ between the pane-shaped min element 50 and the imaging system 10 marks a second edge point 52. Both edge points differ from each other due to their location, wherein the distance between the first edge point 51 and the second edge point 52 along the circumference U of the pane-shaped element 50 is according to the invention at least 10% of the circumference U of the pane-shaped element 50.

Figure 6:
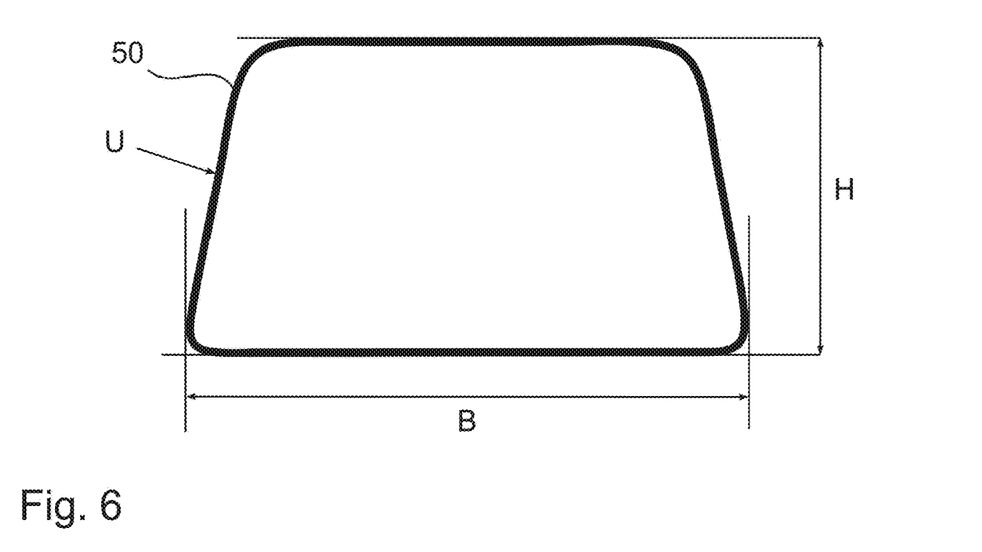
FIG. 6 shows a schematic view of a preferred embodiment of a pane-shaped element.

FIG. 6 shows a schematic view of a preferred embodiment of a pane-shaped element 50. In particular, this can be the windscreen 55 of a motor vehicle, a water vehicle, an airborne vehicle or a space vehicle. Otherwise, however, all other types of window panes, viewing windows, windscreens or similar are also comprised. According to the invention, a pane-shaped element 50 is characterised at least by the fact that on this element, a surrounding edge with a corresponding circumference U can be defined. Further, in the minimal outer dimension of the pane-shaped element, a height H and a breadth B preferably occur. The height H and breadth B here preferably deviate by at least one scale of size upwards from the spatial depth T also occurring in the outer dimension of the pane-shaped element 50. The thickness here preferably arises from the middle thickness of the edge. With windscreens 55 of motor vehicles, this value corresponds to a uniform pane thickness.

Figure 7A:
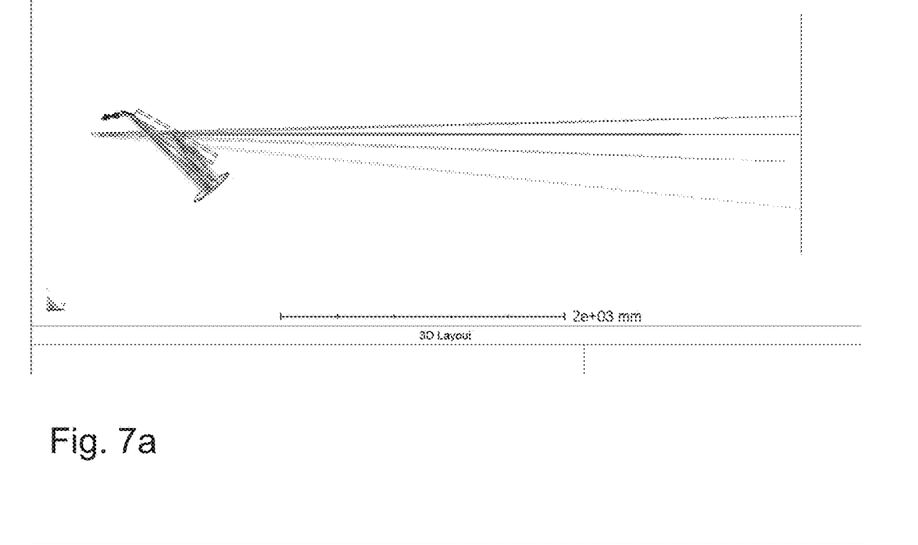
FIGS. 7a and 7b show beam paths for a specific embodiment of an optical system according to the invention in the side view (FIG. 7a) and in the top view (FIG. 7b) for a nominal position.
Figure 7B:
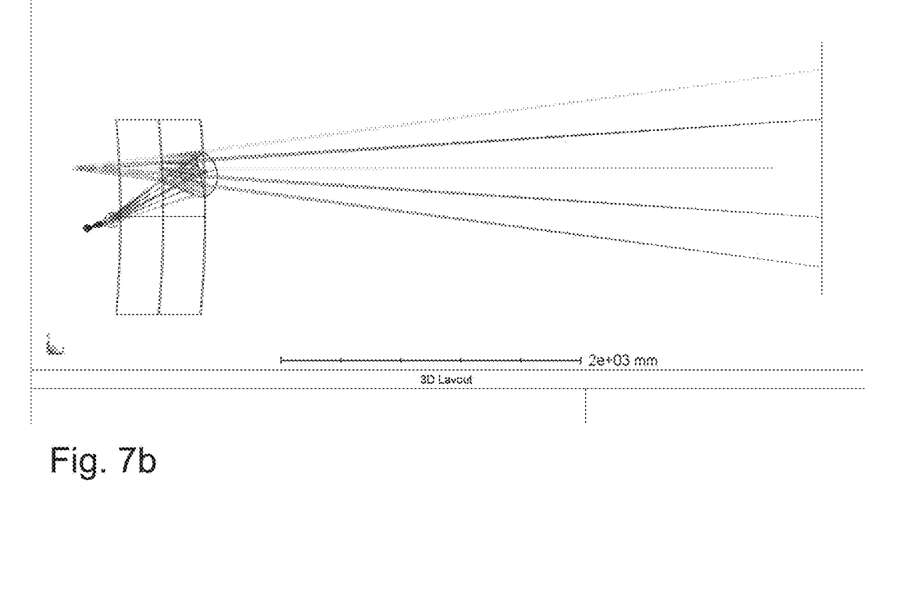
Figure 8A:
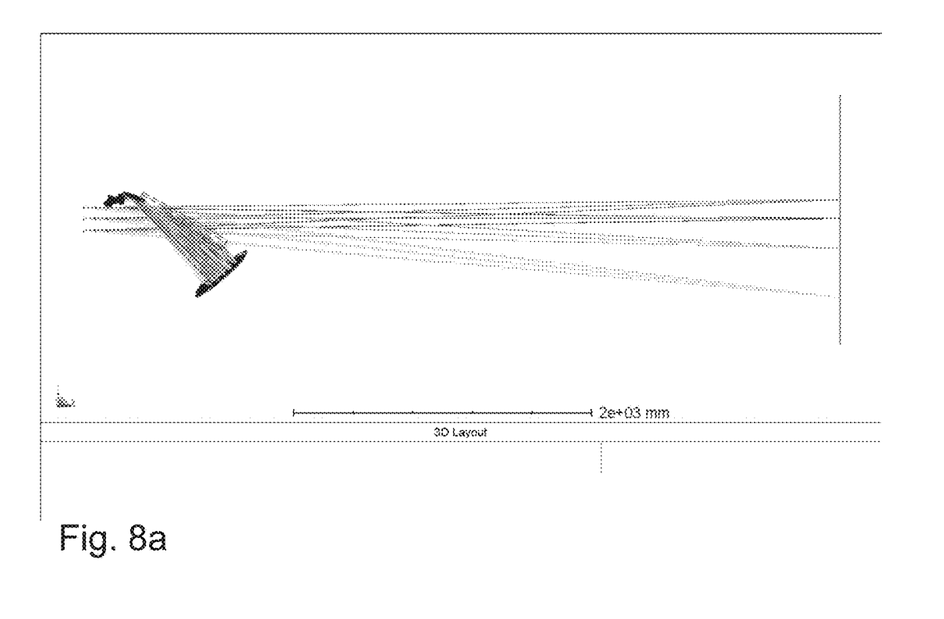
FIGS. 8a and 8b show beam paths for a specific embodiment of an optical system according to the invention in the side view (8a) and in the top view (FIG. 8b) for the extreme positions.
Figure 8B:
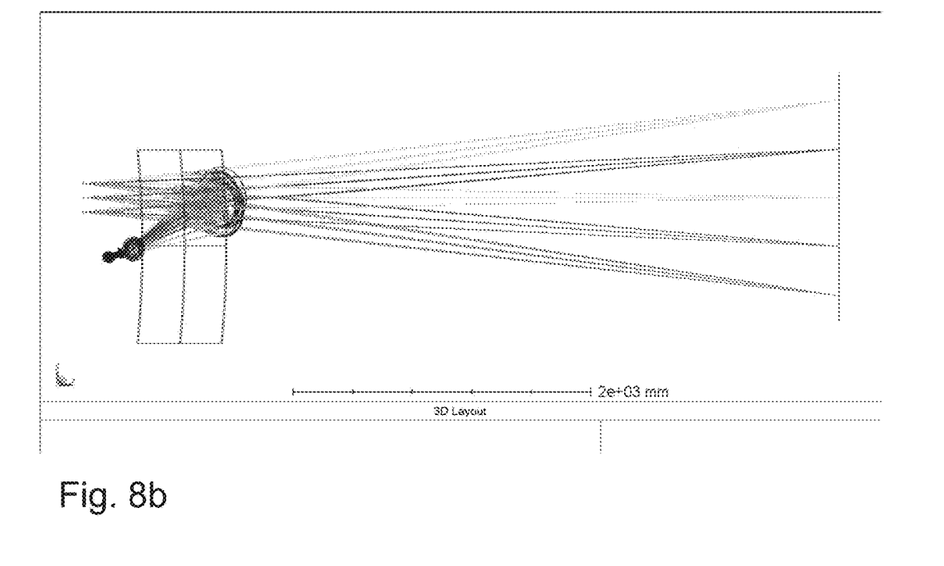

Below, a specific exemplary embodiment is given for an HUD in motor vehicles. In FIGS. 7a and 7b, the beam paths for an embodiment of an optical system according to the invention is shown in the side view (FIG. 7a) and in the top view (FIG. 7b) for a nominal position of the driver or an eye. In FIGS. 8a and 8b, with this embodiment, the beam paths of the optical system according to the invention are shown in the side view (FIG. 8a) and in the top view (FIG. 8b) for the extreme positions of the driver or an eye. The extreme positions are determined by the size of the HMB, wherein the nominal position is preferably located in the geometric centre of the HMB.

The virtual image is mirrored only in one eye. The eye is preferably freely selectable in an application. When the beam path was simulated, it was assumed that the distance between the eyebox and the virtual image was 5 m.
Field of view: 15°×7.5°
Diameter of the eyebox: 22.3 mm
Head Motion Box (B×H×D): 200×160×160 mm³
Resolution: 1152×676 px²
Mirror size of the deflection device: ~440×260 mm²
Mirror size of the display system: ~144×87 mm²
Number of lenses in the lens system: 7
Size of the windscreen: 1300×650 mm²
Angle of the windscreen to the horizon: 30°
Distance, lower windscreen edge—road approx. 95 mm
Distance, windscreen—eyebox (nominal position): 600 mm
Distance, eyebox (nominal position)—road: 1100 mm The lens system comprises an aspherical surface, a free-form surface and a cementing element. Two mirrors are used. One mirror serves as a deflection device, while the second is a part of the display system. Both mirrors are free-form surfaces. Due to a typical curvature of windscreens in motor vehicles, at least one free-form surface is required here as compensation. Both mirrors are tilted around the two lateral axes which stand vertical in relation to each other. With this embodiment, the rotation points are located on the mirror surfaces. Preferably, however, the rotating point of the mirror in the deflection facility can also be arranged below or above the mirror, so that the mirror can additionally also be laterally moved for tilting. As a result, the construction space in the dashboard remains largely unchanged, but the required mirror surface is reduced in size and the mirror can thus be produced at a lower cost and in a simpler manner.

LIST OF REFERENCE NUMERALS

10 Imaging system
20 Display system
22 Means for beam guidance
30 Observer
40 Deflection device
50 Pane-shaped element
51 First edge point
52 Second edge point
55 Windscreen
60 Virtual image
$d_{min}^{(1)}$ First minimal distance (pane-shaped element—deflection device)
$d_{min}^{(1)}$ Second minimal distance (pane-shaped element—imaging system)
B Breadth
H Height
U Circumference

What is claimed is:

1. An optical system, comprising:
an imaging system designed to impress image information onto an optical radiation;
a display system designed to project the optical radiation;
a deflection device designed to deflect the projected optical radiation, wherein the deflection device allows an active control of the deflection direction in at least two degrees of freedom, wherein the deflection device comprises a mirror that is supported in such a manner that it can be rotated and/or its position can be changed;
at least one optically transparent pane-shaped element designed to at least partially reflect the deflected optical radiation, wherein the deflection device guides the projected optical radiation onto the pane-shaped element in such a manner that the optical radiation hits the pane-shaped element at an angle,
wherein the imaging system, the display system, the deflection device and the pane-shaped element are arranged in relation to each other such that a virtual image of optical radiation containing the image information is generated, wherein a first edge point of the pane-shaped element differs from a second edge point of the pane-shaped element, and wherein the first edge point comprises a minimal distance ($d_{min}^{(1)}$) to the deflection device and the second edge point comprises a minimal distance ($d_{min}^{(2)}$) to the imaging system, wherein a distance between the first edge point and the second edge point along a circumference (U) of the pane-shaped element is at least 10% of the circumference (U) of the pane-shaped element;
an eye tracking module, designed to determine a Line-of-Sight of an observer onto the pane-shaped element; and
a control unit, adapted to vary a position of the virtual image in a region of the pane-shaped element by means of the deflection device such that the virtual image is tracked to the Line-of-Sight of the observer, wherein for every Line-of-Sight of an observer onto the pane-shaped element the size of the virtual image directly created by the imaging system is smaller than 90% of a Field-of-View of the optical system.

2. The optical system according to claim 1, wherein the control unit is designed to adjust an eyebox and/or image information shown to a direction of view of the observer onto the pane-shaped element.

3. The optical system according to claim 1, wherein the imaging system is a Pico projector.

4. The optical system according to claim 2, wherein the eyebox has a diameter of between 5 mm and 30 mm.

5. The optical system according to claim 1, wherein in order to control optical properties of the display system, a pivoting lens system is tilted and/or at least an air gap within the display system is adapted.

6. The optical system according to claim 1, wherein the optical system comprises a glare protection for suppressing sun reflections.

7. A method for operating a Head-Up Display, comprising the following method steps:
provi­ding an optical system according to claim 1; and
creating a virtual optical display of image information shown by the imaging system in an area of the pane-shaped element.

8. The method according to claim 7, further comprising:
determining an eye position of an observer onto the pane-shaped element; and
changing the position of the virtual image in the region of the pane-shaped element and/or adjusting the image information shown to the direction of view of an observer onto the pane-shaped element.

9. The method according to claim 7, wherein a control of optical properties of the display system is conducted by tilting a pivoting lens system and/or by adjusting at least one air gap within the display system.

10. The method according to claim 8, wherein a control of optical properties of the display system is conducted by tilting a pivoting lens system and/or by adjusting at least one air gap within the display system.

11. The optical system according to claim 1, wherein the optical system comprises a computational evaluation of previously ascertained eye position data or an additional system for determining a length of the Line-of-Sight, wherein the control unit adapts the size of the eyebox to the length of the Line-of-Sight of the observer.

12. The method according to claim 9, further comprising:
determining the length of the Line-of-Sight of the observer; and
adjusting the size of the eyebox of the imaging system to the length of the Line-of-Sight.

\* \* \* \* \*